United States Patent [19]

Takayanagi

[11] Patent Number: 5,168,371
[45] Date of Patent: Dec. 1, 1992

[54] IMAGE PROCESSING SYSTEM FOR GENERATING, STORING, AND TRANSMITTING IMAGE DATAFILES ASSOCIATED WITH ENCIPHERED IDENTIFICATION INFORMATION

[75] Inventor: Hiroshi Takayanagi, Kanagawa, Japan

[73] Assignee: Fuji Xerox Co., Ltd., Tokyo, Japan

[21] Appl. No.: 627,496

[22] Filed: Dec. 14, 1990

[51] Int. Cl.$^5$ .................. H04N 1/44; H04K 1/00; H04L 9/32
[52] U.S. Cl. .................................. 358/296; 380/18; 380/23
[58] Field of Search ................ 358/296, 401; 380/10, 380/18, 21, 23, 43, 44, 45

[56] References Cited

U.S. PATENT DOCUMENTS

| | | | |
|---|---|---|---|
| 4,218,738 | 8/1980 | Matyas | 380/25 |
| 4,295,167 | 10/1981 | Wiggins . | |
| 4,757,348 | 7/1988 | Rourke et al. . | |

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT

A picture image processing system for performing picture image processing operations in a picture image processing unit on picture input data from an input unit on the basis of corresponding job parameters to produce picture image datafiles for output by a picture image output unit. The system comprises an enciphered identification key input unit provided in the input unit for the selective entry of an enciphered identification key associated with one of the picture image datafiles, memory for storing the picture image datafiles, the corresponding job parameters, and enciphered identification key codes associated with the picture image datafiles, a cipher deciding unit for determining whether the enciphered identification key inputted by the input unit corresponds to an enciphered identification key code associated with one of the picture image datafiles, and a control unit responsive to the cipher deciding means determining that the enciphered identification key inputted by the input unit corresponds to an enciphered identification key code associated with one of the picture image datafiles for controlling the picture image output unit to output the one picture image datafile.

8 Claims, 7 Drawing Sheets

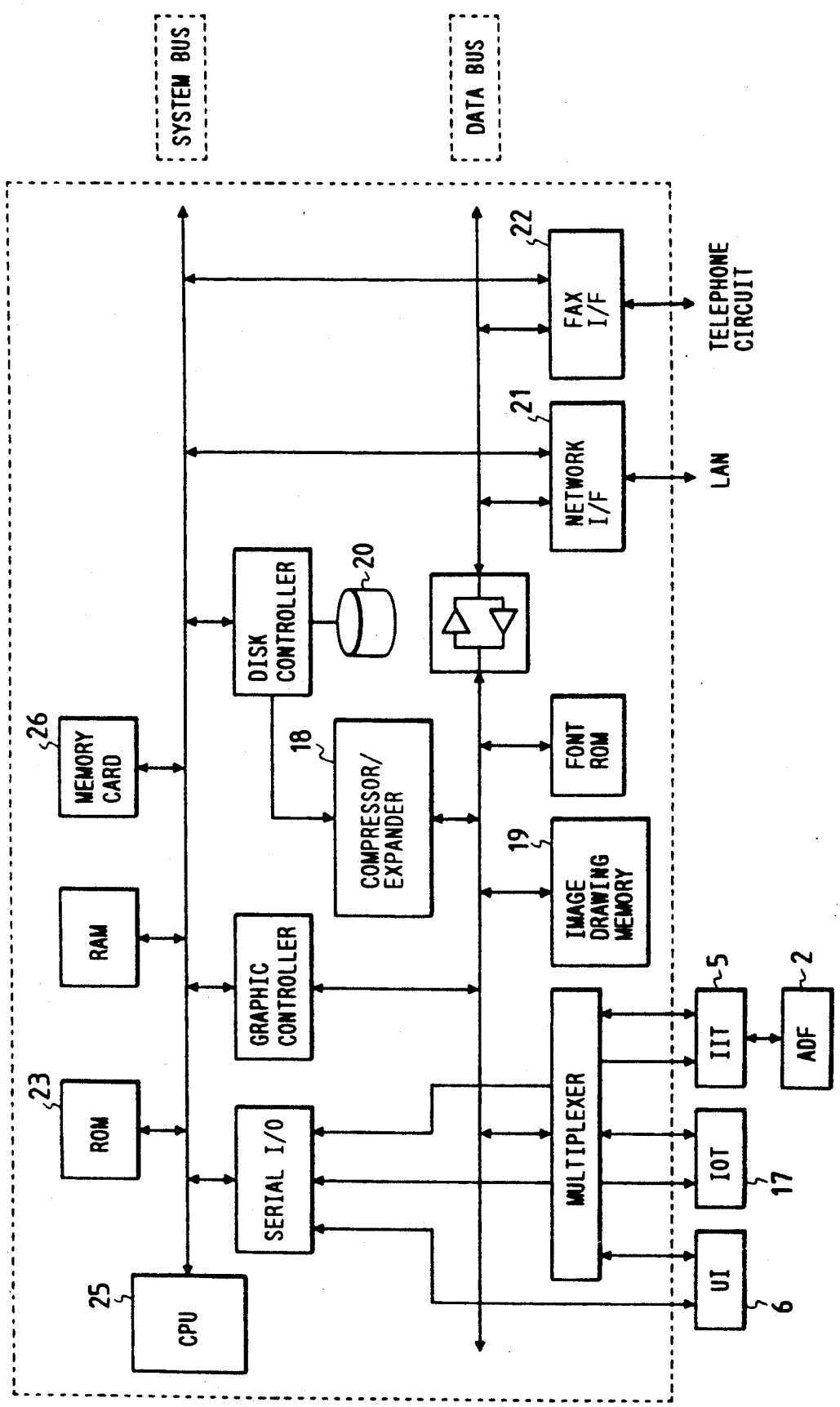

FIG. 3

JOB CONTROL SHEET

MARK IN PENCIL

■ SHEET SIZE ○B5 ○A4 ○B4 ○A3

■ NUMBER OF COPIES
: 10 DIGITS ① ② ③ ④ ⑤ ⑥ ⑦ ⑧ ⑨ ⑩

■ NUMBER OF COPIES
: 1 DIGIT ① ② ③ ④ ⑤ ⑥ ⑦ ⑧ ⑨

AFTER TREATMENT ○RDH ○STAPLING ○PASTING

■ MAGNIFICATION FOR
MANUAL ADJUSTMENT ○

■ MAGNIFICATION
% 100 DIGITS ① ② ③ ④

■ MAGNIFICATION
% 10 DIGITS ① ② ③ ④ ⑤ ⑥ ⑦ ⑧ ⑨ ⑩

■ MAGNIFICATION
% 1 DIGIT ① ② ③ ④ ⑤ ⑥ ⑦ ⑧ ⑨ ⑩

■ DATA SAVING AFTER COPYING ○

■ SETTING ENCIPHERED
IDENTIFICATION
KEY MODE ○

■ ENCIPHERED
IDENTIFICATION KEY
CODE IN 10 DIGITS ① ② ③ ④ ⑤ ⑥ ⑦ ⑧ ⑨ ⑩

■ ENCIPHERED
IDENTIFICATION KEY
CODE IN 1 DIGIT ① ② ③ ④ ⑤ ⑥ ⑦ ⑧ ⑨

ANY NUMERICAL FIGURE NOT PAINTED
OUT WILL BE READ AS ZERO

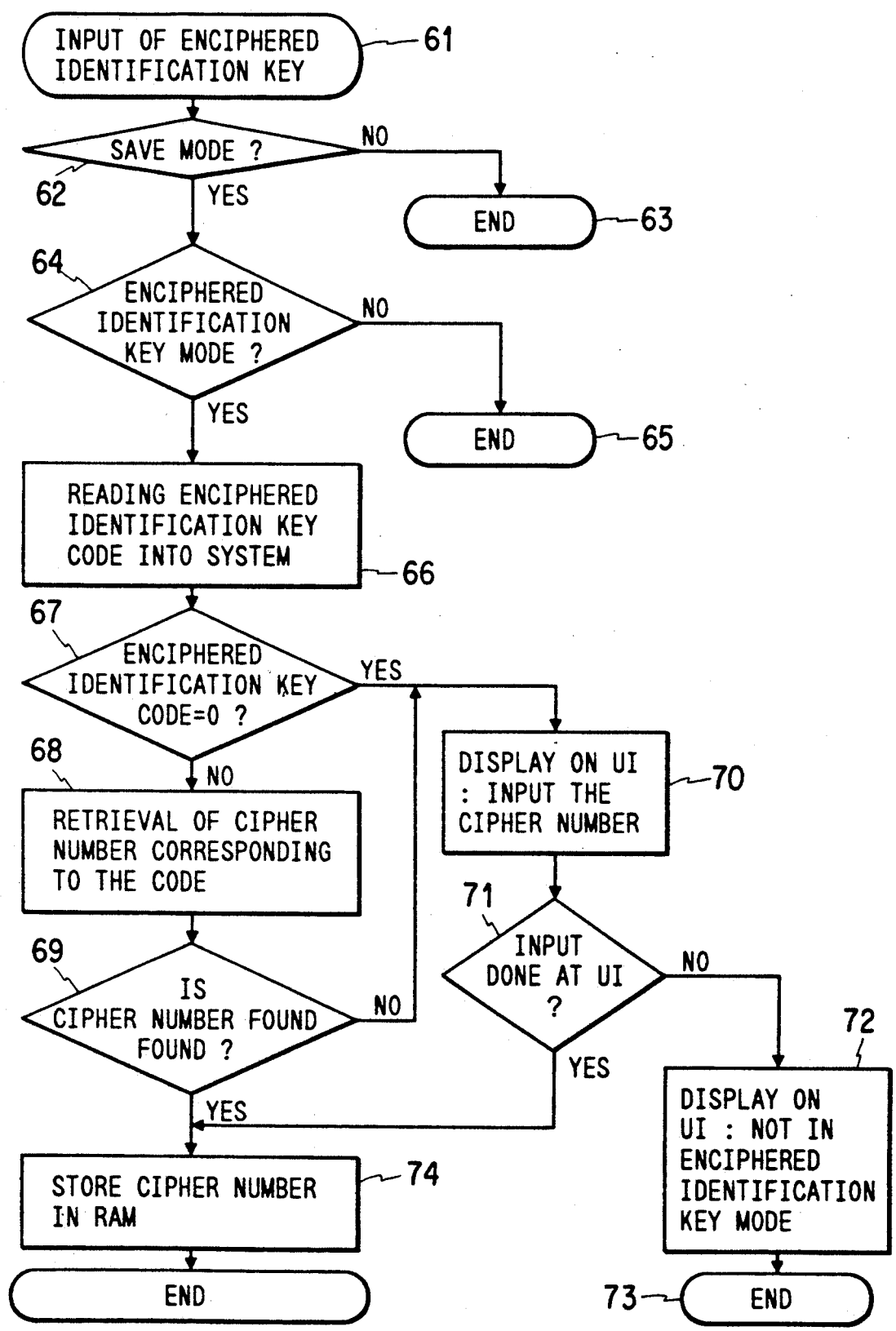

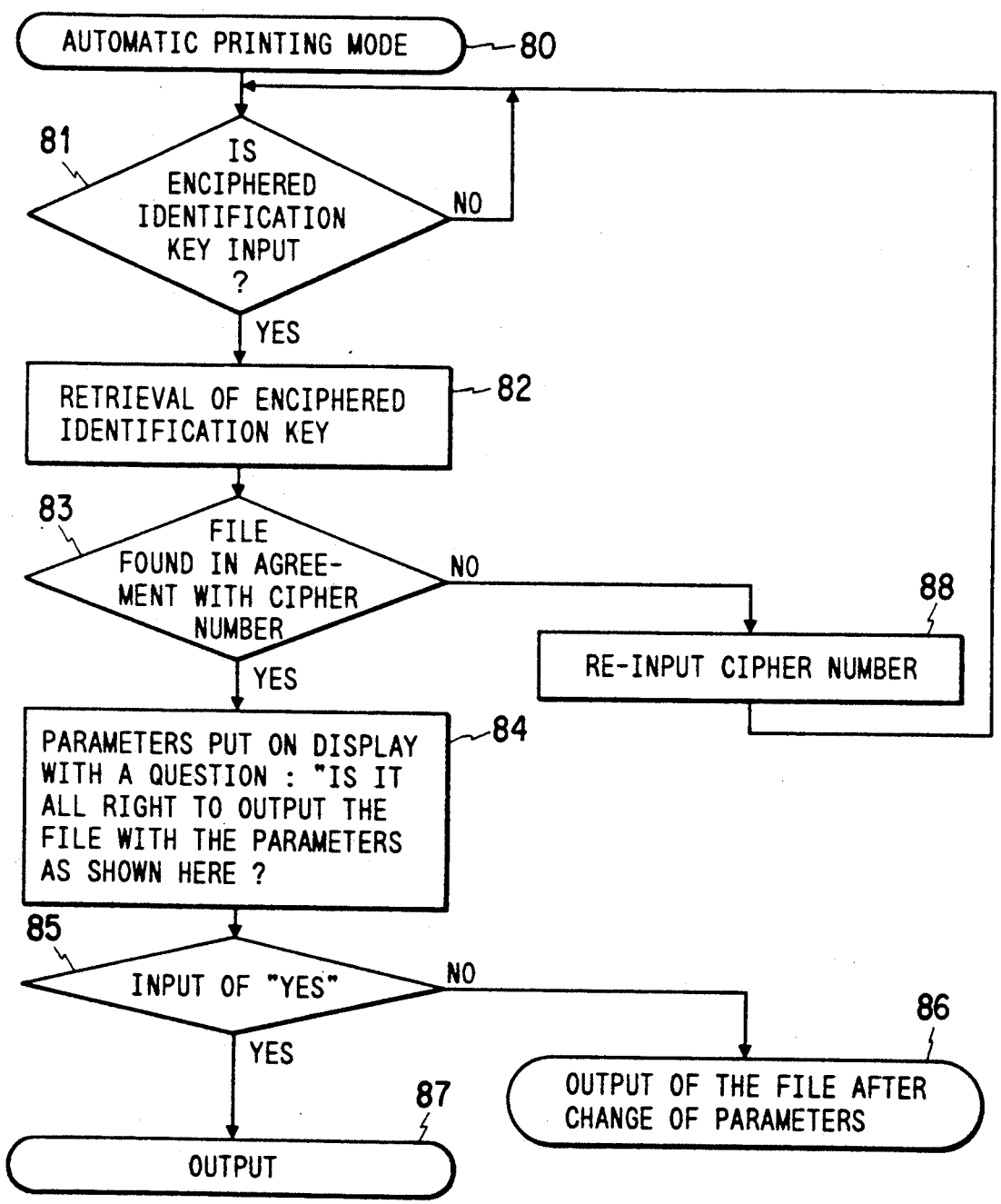

IMAGE PROCESSING SYSTEM FOR GENERATING, STORING, AND TRANSMITTING IMAGE DATAFILES ASSOCIATED WITH ENCIPHERED IDENTIFICATION INFORMATION

BACKGROUND OF THE INVENTION

1. Field of the Invention

The present invention relates to a picture image processing system of the picture image storage type which temporarily stores and accumulates picture image data temporarily read into the system.

2. Discussion of the Related Art

A picture image storage type electrophotographic copying machine is comprised of a reading device, a storage device, and a picture image output device, and offers many such functions as electronic RDH (Recirculating Document Handler), reverse sequence output, and sample copying. Picture images (original documents) need be read only once by a reading device, such as a digital raster scanner, and then stored in picture image files with associated job parameters. The job parameters are operating instructions for the picture image processing system and include instructions on such items as the paper size and paper orientation, the number of pages, the number of chromatic grades or shades, colors, binding margin, and photographic modes. (The operating instructions will be sometimes referred to as "the parameters" in this specification.) The storage device may be a hard disk from which picture images may be read and printed in a regular sequence.

This type of system enables the operator to obtain a sample copy for confirmation of the contents and then to produce large quantities of copies, with corrections made as necessary, and also to have the equipment read and store parts of an original document in advance, to expedite subsequent processing operations, even if all of the sheets of the original document are not ready.

Highly dense images generate picture image data in an enormous amount, e.g., up to four megabytes for a single sheet of binary picture images with 600 by 600 dpi on a standard A-4 size sheet. Even if the picture image data is compressed, the amount of picture image data may be as large as several hundred kilobytes. Conventional picture image processing systems, such as the electrophotographic copying machine mentioned above, has had the shortcoming that the system will not have sufficient storage capacity in the hard disk for a sufficient number of documents.

File security and prevention of unauthorized access of files are serious problems with a conventional system such as the one just described. There is a significant risk that a third party may print or modify the stored picture image datafiles without permission.

SUMMARY OF THE INVENTION

The present invention has been made in view of the above circumstances and has as an object a picture image processing system that insures the security of picture image datafiles by prohibiting any unauthorized person from accessing stored picture image datafiles.

Another object of the present invention is a picture image processing system that provides for establishing and releasing datafile protection in a highly efficient manner.

A further object of the present invention is a picture image processing system capable of maximizing the utilization of the effective residual storage capacity in a storage device on the basis of the relative importance of the picture image datafiles.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In order to achieve the objects set forth hereinabove and in accordance with the purpose of the invention as embodied and broadly described herein, a picture image processing system for performing picture image processing operations in a picture image processing unit on picture input data from an input unit on the basis of corresponding job parameters to produce picture image datafiles for output by a picture image output unit comprises enciphered identification key input means provided in the input unit for the selective entry of an enciphered identification key associated with one of the picture image datafiles, means for storing the picture image datafiles, the corresponding job parameters, and enciphered identification key codes associated with the picture image datafiles, cipher deciding means for determining whether the enciphered identification key inputted by the input unit corresponds to an enciphered identification key code associated with one of the picture image datafiles, and means, responsive to the cipher deciding means determining that the enciphered identification key inputted by the input unit corresponds to an enciphered identification key code associated with one of the picture image datafiles, for controlling the picture image output unit to output the one picture image datafile.

BRIEF DESCRIPTION OF THE DRAWINGS

The accompanying drawings, which are incorporated in and constitute a part of this Specification illustrate embodiments of the present invention and, together with the description, serve to explain the objects, advantages and principles of the invention. In the drawings:

FIG. 2 is a block diagram relating to the control of the picture image processing system according to the present invention;

FIG. 3 illustrates a job control sheet;

FIGS. 6(a) and 6(b) are flow charts showing the procedure for deleting a picture image datafile in the storing means in the system according to the present invention.

DETAILED DESCRIPTION OF THE INVENTION

The picture image processing system of the present invention outputs picture image datafiles created from optically scanning batches of original documents bearing picture images such as text, photographs, drawings, and the like. Picture image processing operations are performed on the picture image datafiles by a picture image processing unit on the basis of job parameters, which are operating instructions for execution by the picture image processing system.

The picture image processing unit comprises a storing means for temporarily storing and accumulating input data and job parameters, and converts the picture image datafiles into digital signals in accordance with the job parameters. The converted data representing an original document or the like is stored and can be outputted from time to time in accordance with the parameters corresponding to the particular original document. In case the job parameters exceed set values, the system deletes the associated picture image datafiles when necessary to secure more storage capacity in the storing means. In this process, the system deletes a picture image datafile in the storage means on the basis of a save level code set up in accordance with the degree of importance of each picture image datafile.

The picture image processing system according to the present invention stores in the storing means, the picture image datafiles containing the document images converted into digital signals in the picture image processing unit together with the job parameters. The system outputs the datafiles of an original document or the like to the picture image output unit from time to time as required in accordance with the job parameters.

An enciphered identification key manual input means is provided for entering a user's enciphered identification key. The storing means stores and accumulates picture image datafiles, job parameters, and the data relating to the enciphered identification key. A cipher deciding means determines whether the enciphered identification key inputted by the user from the enciphered identification key input means corresponds to the enciphered identification key code kept in the storing means. A control means controls the output of picture image datafiles stored in the storing means to a picture image output unit in accordance with the job parameters when the said cipher deciding means has determined that the input enciphered identification key agrees with the enciphered identification key code stored in the system.

The system permits the input of an enciphered identification key for a picture image datafile, and the output of any picture image datafile with such an enciphered identification key only after the user has input a proper enciphered identification key from the enciphered identification key input means.

Figure 1:
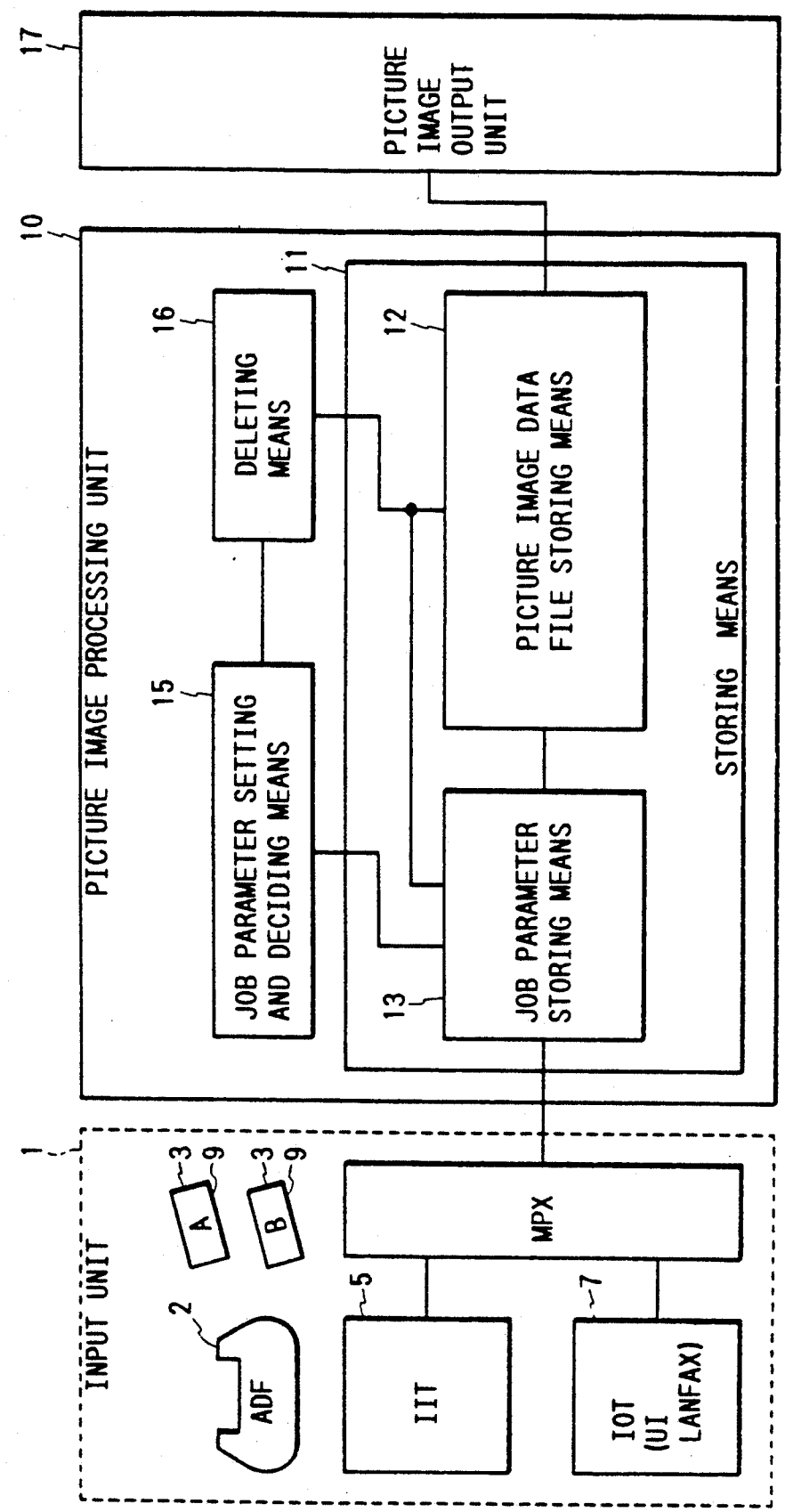
FIG. 1 is a conceptual drawing of the overall configuration of the picture image processing system according to the present invention.

FIG. 1 is a conceptual drawing of the overall configuration of an electrophotographic copying machine.

In FIG. 1, batch A, batch B, and so forth, are stacks of sheets of an original document 3 which are set in an automatic document feeder (ADF) 2 in an input unit 1. Picture image data representing the original document 3 is outputted by an image input terminal (IIT) 5 that scans the documents, and is stored in a picture image datafile storing means 12 comprised of a hard disk and an image drawing memory device. A job control sheet 9, on which some of the job parameters (such as the size and orientation of the paper, the number of pages, the number of chromatic grades, colors, binding margin, photographic mode, and a save level code indicating the degree of importance of the associated original document) is placed as the front page of each of batch A and batch B. The job control sheet 9 may also be marked to establish the enciphered identification key made to enable a user to initiate an enciphered identification key input sequence that permits the input of an enciphered identification key and an enciphered identification key code corresponding with the individual enciphered identification keys. Batch A and batch B contains one or more sheets of an original document 3 associated with their respective control sheets 9.

The parameters are stored in a job parameter storing means 13, which may comprise a random access memory device (RAM). Items such as the time when the particular picture image datafile was created are also written into the job parameter storing means 13. The picture image datafiles are created by optically scanning the respective original documents 3 in batch A and batch B in accordance with the associated sets of parameters. An original document 3 that does not have any job control sheet 9, however, can first be read into the system by means of the Image Input Terminal (IIT) 5 (a digital raster scanner), with the original document 3 fed via the automatic document feeder (ADF) 2. The associated job parameters can be set for particular document through a user interface (UI) 6, which includes a control panel, a display, a keyboard, and a mouse.

The input unit 1 is comprised of the user interface (UI) 6 for this copying machine and also other picture image processing units such as a personal computer system connected to the system via a network (LAN) and a facsimile machine connected by a telephone line (FIG. 2).

The picture image data read into the system in this manner are edited as appropriate in the picture image processing unit 10 and stored temporarily in the form of picture image datafiles in the picture image datafile storing means 12. A picture image datafile can be outputted repeatedly to generate a required number of copies by the picture image output unit 17. Also, depending on the circumstances, a picture image datafile may be outputted to another picture image processing unit via a network line LAN or a telephone line (FIG. 2).

After a picture image datafile is outputted, the stored picture image datafile in the picture image datafile storing means 12 may be deleted as a general rule. Normally when a job parameter setting and deciding means 15 determines from the job parameters that the job has been completed, a deleting means 16 will delete the picture image datafile in the picture image datafile storing means 12 and the parameters in the job parameter storing means 13. However, depending on the job parameters, a picture image datafile may not be deleted immediately after the picture images are outputted.

In this regard, the job parameter setting and deciding means 15 may comprise a timer, a counter, a comparator, and so forth (not illustrated in the Figure) in the CPU 25 (FIG. 2), and the deleting means 16 may include a CLEAR command output from the CPU 25. The job parameters including the enciphered identification key code are input as job parameters for the stored picture image datafile in the storing means 11, together with the stored picture image datafile. Each enciphered identification key code contains an enciphered identification key, and the corresponding picture image datafile also includes the enciphered identification key.

When any stored picture image datafile with an enciphered identification key it is to be outputted to the picture image output unit 17, the user is required to input a proper enciphered identification key through an enciphered identification key manual input means. If cipher deciding means of job parameter setting and deciding mean 15 determines that the input enciphered identification key corresponds to the enciphered identification key code stored in the system, the output control means 16 issues instructions for the output of the particular picture image data file, and the user is thus able to output the file.

The system permits a change in the setting of the job parameters, and, in accordance with a modified set of parameters, the original document may be outputted to the picture image output unit 17. In this regard, the cipher deciding means may comprise a cipher identification key comparing means including a register, a comparator, and so forth (not illustrated in the Figure) present in the CPU 25 (FIG. 2). The output control means 16 is controlled by picture image output commands issued by the CPU 25.

FIG. 2 presents a detailed block diagram relating to the control of the picture image processing unit 10 in the picture image processing system according to the present invention. The original document 3 and the job control sheet 9, which are fed by the automatic document feeder (ADF) 2, are read by the IIT 5. In this process, the job parameters indicated on the job control sheet 9 and the picture image data on the original documents 3 are distinguished by the IIT 5 and stored in the appropriate memory means. The job parameter data are inputted to the RAM 13, and, in accordance with those job parameters, the picture image data are stored in a 600K byte image drawing memory device 19. The job parameter data, including picture image data configuration items, such as the number of pages and the resolution, the number of chromatic grades, and the presence or absence of color, and so forth for each page, are correlated with the picture image datafile. Page sizes, the numbers of significant bits or the numbers of bytes in the fast scanning direction and in the slow scanning direction, the setting or non-setting of the photographic mode, the date and time when the datafile is created are compiled into encoded information and recorded along with the associated picture image datafile.

The picture image data, as modified by the parameters of the job parameter data in the 600K byte image drawing memory device 19, are stored in a hard disk 20 with a capacity of, for example, 100 megabytes, via a data compressing and expanding block 18. The picture image data are first developed in the image drawing memory device 19 and thereafter written to the hard disk 20 for several reasons. First, the image drawing memory device 19 is employed for editing the picture image data read via the ADF 2, the input data from the UI 6, and the external input data from a facsimile machine, a computer, or the like. Also, the picture image data are compressed in a variable ratio. The image drawing memory device 19 first checks to see how much memory capacity is available for storing the compressed picture image datafile, and then the compressed picture image datafile is stored in vacant areas on the hard disk 20.

Generally, a picture image datafile stored on the hard disk 20 will be deleted together with the parameters after it is used to produce the required number of printed copies of the original batch of documents in order to complete a processing job. That is, the picture image datafile will be deleted when operations specified by the associated parameters, such as electronic document recirculating, enlargement or reduction by a specified ratio, copying to produce a specified number of copies, simplex or duplex copying, stapling, binding, and the like, are performed on the basis of the job parameters. This file should not be deleted, however, if it is not fully executed such as in the case where a few number of copies are first printed for a preliminary check on the contents prior to printing the file on a large number of copies. The file should not be deleted when it is likely to do so would lead to the trouble of reinputting the original document.

In this system, it is possible to receive picture image data and to transmit picture image data to an outside system, via a LAN (local area network) or a telephone line through a network interface 21 and facsimile interface 22, respectively. Personal computers, workstations, other copying machines, and the like, may be connected to the LAN line or the telephone line.

It is also sometimes necessary to display the picture image data on a cathode ray tube (CRT) at the time that the data is being inputted, for example, from a control panel (not illustrated in the Figure) provided with a CRT in this picture image processing system.

The control procedure described hereinabove is executed under the control of the CPU 25 in accordance with the control programs stored in the ROM 23. In this regard, a memory card 26 may also be used for storing job parameters unique to a user.

FIG. 3 illustrates an example of a job control sheet 9 that specifies the job parameters for picture image data. The individual parameters on the job control sheet 9 may be indicated by marking in pencil. Also, in order to distinguish data on the job control sheet 9 from ordinary picture image data, the control sheet is provided with a tag 27 protruding from the sheet 9 in the upper right corner. While the tag 27 may comprise a protrusion, it is also feasible to provide an area with a bar code to be read in a specified corner on the job control sheet 9. Moreover, a series of (timing) clock marks 28 is provided at the left end corresponding to the entry line for each job parameter. The clock marks 28 are used for synchronizing a reading sensor (FIGS. 4(a) and 4(b) at the time that job parameter data is read by the IIT 5. Selected items of the job parameter can also be entered through a keyboard after display on the display screen (not illustrated) of a CRT unit.

Figure 4A:
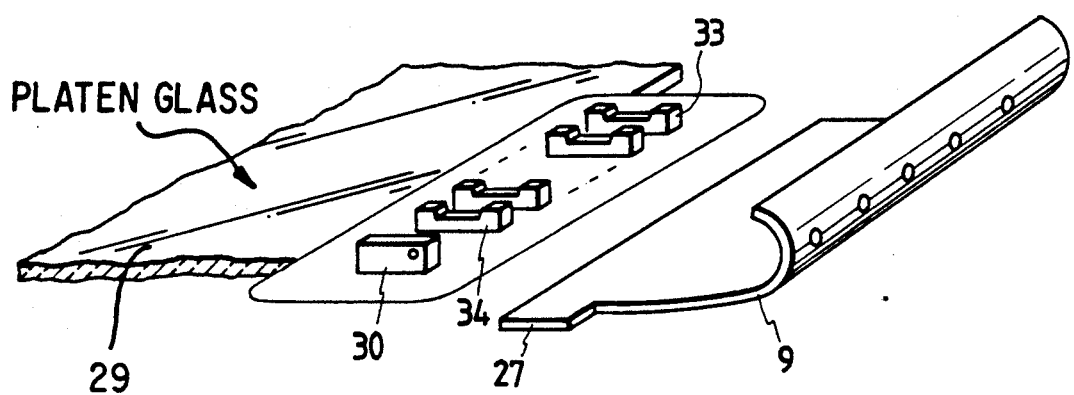
FIGS. 4(a) and 4(b) respectively illustrate in partial cut away the principal parts of the read area of the job control sheet and a control circuit.
Figure 4B:
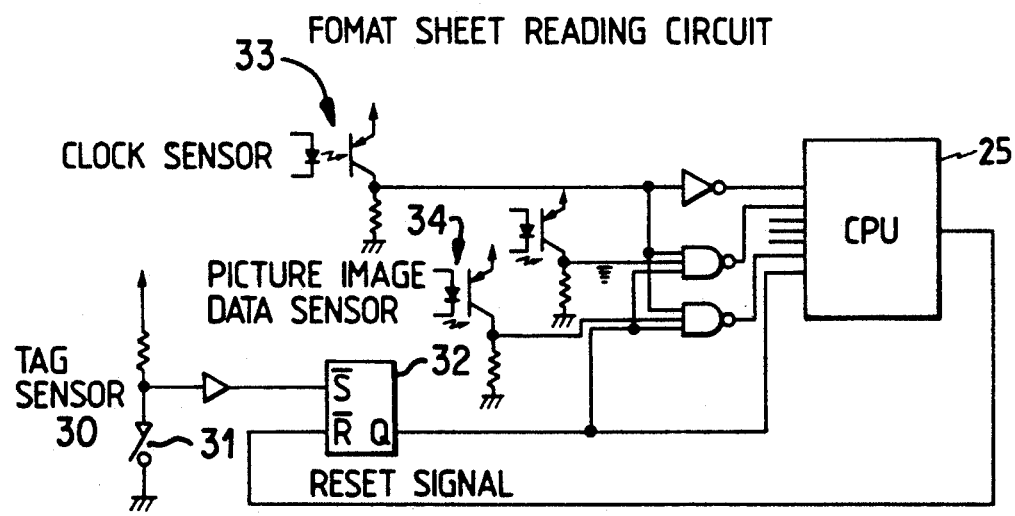

FIGS. 4(a) and 4(b) show the principal parts of a read area of the IIT 5 for reading the job control sheet 9, as well as a diagram for the reading circuit. In the IIT 5 illustrated in FIG. 4(a), the tag 27 protruding from the job control sheet 9 is read by the tag sensor 30 before the job control sheet 9 is fed to the platen glass 29 of the IIT 5.

In the job control sheet reading circuit shown in FIG. 4(b), a plurality of reading sensors 34 extend in a direction crossing at right angles with the direction of movement of the original document in the IIT 5 to read the individual job parameter data marked in pencil at the same time that a clock mark sensor 33 reads the clock marks 28 on the job control sheet 9 by the closing of a switch 31 on the tag sensor 30. This sets the flip-flop 32.

The CPU 25 writes the job parameter data to the RAM 13 (FIG. 2 and FIG. 5) and, depending on the circumstances, also to a memory card 26 to set the job parameters for processing of picture images of the associated batch of original documents 3.

Figure 5:
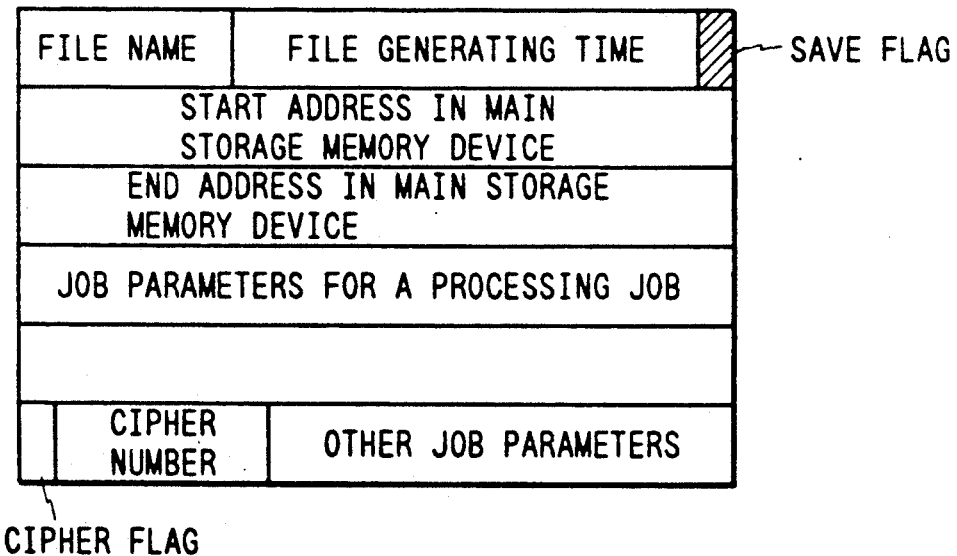
FIG. 5 illustrates a random access memory (RAM) used in the system of the present invention to store the parameters and so forth.

When the job control sheet 9 is discharged from the area on the platen glass 29 of the IIT 5, a reset signal is transmitted from the CPU 25 to the job control sheet reading circuit, and reading of the job control sheet 9 is finished. The job parameter data that are read are stored in the job parameter address in the RAM 13, as shown in FIG. 5. In this regard, each file of image data representing a batch of original documents is given a datafile name at the time when the file is created. The datafile name is stored with the start address and end address of the associated picture image datafile for the particular original documents in a memory area for job parameter data on the hard disk. Moreover, a save flag which serves the purpose of retaining without deletion a stored datafile even after it is outputted by the picture image output unit 17, and a cipher flag (number) are stored. The datafile name for a batch of original documents may be inputted from the control panel, etc.

The job control sheet 9 has a save level column, an enciphered identification key mode column, and an enciphered identification key code on it, and when a mark is entered in these columns a save level corresponding to a marked save code will be stored in the associated parameter area of the RAM 25. Also, the system will be put in the enciphered identification key mode with the cipher flag set and a cipher number will be stored in the parameter area of the RAM 25 as the enciphered identification key.

The enciphered number may comprise six digits established by reference to a reference table to establish a correspondence between the enciphered identification key code and the enciphered identification numbers. Although a numerical cipher number is cited in this example, the cipher code is not limited to numerical figures, but may be formed of other types of enciphering elements such as characters and graphic figures.

With respect to the save level, level "1" represents "do not delete," and is normally assigned to regularly used forms, overlay forms, logomarks, and the like. Level "2" represents "important," which indicates that it would be a significant task to reinput the original document and that deletion of the picture image file should be avoided if possible. Typical level 2 documents include original documents having non-regular formats, original documents printed on thin paper, and original documents that are difficult to access. The user may decide which save level is to be given to a picture image datafile, and in case neither the level 1 nor the level 2 is marked, the save level of the file will default to level "3," which corresponds to the lowest degree of importance. In general, image datafiles are stored temporarily in the hard disk 20 and then deleted, but the system of the present invention permits the user to enter a save flag for each file.

When power is applied, the control circuit retrieves a list of the files of picture image data stored in the nonvolatile RAM 13 and deletes those files having a save level "3" from the storage device. This results in deletion of the associated picture image datafiles from the hard disk 20. The CPU 25 then starts normal processing operations.

If more picture image files are added to an extent that the effective storage usage, i.e. the working memory, of the hard disk 20 exceeds 50 percent of the memory capacity of the hard disk 20, a memory counter (not illustrated) interrupts the operation of the CPU 25. Thereupon, the CPU 25 performs operations to delete files having save level 3 which have already been outputted in printed form and to delete files with save level 2 which were created more than a predetermined time period in the past, e.g., 24 hours, in order to secure additional working memory on the disk 20. If the usage level of the working memory increases to more than 70 percent of the memory capacity of the hard disk 20, the memory counter again interrupts the CPU 25. The CPU 25 then deletes all files with save level 3 and the level 2 to free up additional disk area.

In the example described above, the effective residual storage capacity of the hard disk 20 and the lapse of time from the time when a given picture image datafile is created on the hard disk 20 are taken as job parameters. It is also possible to use the number of pages printed by the output unit (Image Output Unit: IOT) 17 as a parameter instead of elapsed time from file creation. Moreover, the set value deciding means, which decides whether or not the picture image datafiles are to be deleted, is composed of a timer and a comparator (not illustrated) in the example in which the elapsed time from creation is used as a job parameter, but would not be used if the number of pages printed is taken as a job parameter. In such a case, a printed page counter, which counts the number of sheets printed, (not illustrated) and a comparator may be used. Moreover, the set value deciding means for the effective residual storage capacity of the hard disk is composed of a memory counter and a comparator.

The set value for deleting a file may be decided with reference to a table combining two or more of parameters such as elapsed time from creation, the number of printed sheets, and the effective residual storage capacity of the hard disk.

Together with the picture image data read from the original document 3 with the input unit 1, the system reads the parameters on the save mode, the enciphered identification key mode, and the enciphered identification key code from the job control sheet 9. Then, a sample may be outputted, if necessary, and the printed contents checked for quality. As the circumstances require, a desired filename can be retrieved out of the picture image data files stored in the hard disk 20 and displayed on the screen of a display unit (not illustrated), such as a CRT unit. If the enciphered identification key inputted corresponds to the enciphered identification key input in advance as the name of the particular file, the system clears the cipher flag and outputs the specified file by the prescribed procedure from the picture image output unit (Image Output Terminal: IOT) 17.

After a file is outputted to the picture image output unit 17, the picture image data file will normally be deleted from the storing means 12, together with the enciphered identification key code, the cipher number, and other job parameters. If the cipher flag is not cleared, the picture image datafile will not be deleted from the storing means 12. Moreover, this system may be designed in such a manner that the picture image datafile, the job parameters, and the data relating to the enciphered identification key stored in the storing means are deleted even in case the cipher deciding means does not find that the input enciphered identification key corresponds to with the enciphered identification key code stored in the system.

Moreover, the system may also be so designed that it will output a picture image datafile when an enciphered identification key is inputted for a direct search of the file corresponding to the input enciphered identification key without the procedure for retrieving the name of a desired file, for executing a job for printing a file on paper in large quantities.

Furthermore, the system may also be so designed that it does not perform the setting of the enciphered identification key mode and the enciphered identification key with a job control sheet 9 but will instead accept the input of data relating to the above-mentioned enciphered identification key from the control panel or from another input unit to such an extent that an input enciphered identification key can establish its proper correspondence with a picture image data file.

Next, the procedure for the input of an enciphered identification key in this example of preferred embodiment is described in detail with reference to the flow chart given in FIG. 6 (a).

First this system stores in the hard disk 20 a picture image datafile input from the input unit. Although such a picture image datafile normally will be deleted upon output to the picture image output unit 17, datafile can be retained in the storage unit (disk 20) when the save mode is indicated on the job control sheet 9 (FIG. 3) in case it is desired not to have the file deleted even after it is output to the picture image output unit. The enciphered identification key can be input on the job control sheet (step 61). The system then discerns whether there is a save code marked on the job control sheet (step 62). If the save code is not marked on the job control sheet, the procedure ends (step 63). At step 64, the system checks whether or not there is any enciphered identification key code set up for the file, and, if the enciphered identification key mode is set, the system reads the enciphered identification key code (step 66). If the key mode is not set, the procedure ends (step 65).

If the enciphered identification key code is "0" as indicated in the lowermost row on the job control sheet 9 in FIG. 3, the system determines that the enciphered identification key has not been inputted (step 67), in which case the system permits the input of an enciphered identification key from the user interface (UI) 6 (FIG. 2) (step 70). At step 71, the system determines if the user has inputted the cipher number and proceeds to step 74 if the number has been inputted. If the cipher number is not inputted, the system performs steps 72 and 73. Moreover, when the enciphered identification key code is not "0," the system searches for a cipher number corresponding to each of the enciphered identification key codes (step 68). At step 69, if no cipher number is present, the system permits the input of an enciphered identification key from the UI 6 (step 70). Moreover, if the cipher number is already present, the system turns on the cipher flag in the job parameters area in the RAM 13 and stores the cipher number in the RAM 13 (step 74). Thus, a picture image datafile stored in the hard disk 20 will be outputted to the picture image output unit 17 by operations following the procedure shown in the flow chart given in FIG. 6(b).

First, when instructions are given for the output of a data file, an enciphered identification key may be input all at once without using the enciphered identification key code, or the name of a file in an automatic printing mode (step 80) may be retrieved and the enciphered identification key corresponding to the enciphered identification key code for the name of the particular picture image datafile will be inputted steps 81 and 82.

When the enciphered identification key thus inputted corresponds to the enciphered identification key code, (step 83) the system displays the job parameters for the file on the display unit (not illustrated) of the control panel for the copying equipment (step 84). Changes may be made to the job parameters as required by the circumstances, by way of the UI 6 or the like, and the system will cause the file to be outputted in accordance with the job parameter (steps 85, 86, and 87). In case there is no corresponding enciphered identification key found in storage, a cipher number must be reinputted (step 88).

This example of preferred embodiments has been described with reference to a copying machine, but the present invention is applicable not only to a copying machine but also to such other picture image processing equipments as a printer.

As described hereinabove, the picture image processing system according to the present invention is capable of maintaining the security of the picture image datafiles, and to safeguard the files against unauthorized output or any unauthorized change of any of the picture image datafiles by a third party.

The system proposed in the present invention offers greater protection to the picture image datafiles because the system permits a change in the job parameters of a picture image datafile only after the user has inputted a proper enciphered identification key corresponding to the enciphered identification key code stored in the system. Furthermore, the system according to the present invention is capable of deleting a picture image datafile from the storing means after the particular picture image datafile has been outputted from the picture image output unit in response to an enciphered identification key, so that the system makes it possible to make effective utilization of the limited storage capacity of the storing means.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A picture image processing system for performing picture image processing operations in a picture image processing unit on picture input data from an input unit on a basis of corresponding job parameters to produce picture image datafiles for output by a picture image output unit, comprising:

enciphered identification key input means provided in the input unit for selective entry of an enciphered identification key associated with one of the picture image datafiles;

means for storing the picture image datafiles, the corresponding job parameters, and enciphered identification key codes associated with the picture image datafiles;

cipher deciding means for determining whether the enciphered identification key inputted by said input unit corresponds to an enciphered identification key code associated with one of the picture image datafiles; and means, responsive to said cipher deciding means determining that said enciphered identification key inputted by said input unit corresponds to an enciphered identification key code associated with one of the picture image datafiles, for controlling the picture image output unit to output said one picture image datafile.

2. A picture image processing system according to claim 1, wherein the input unit includes means for manually entering said enciphered identification key.

3. A picture image processing system according to claim 1, wherein the input unit includes job parameter input means for changing job parameters corresponding to picture image data responsive to said cipher deciding means determining that said enciphered identification key inputted by said input unit corresponds to an enciphered identification key code associated with one of the picture image datafiles.

4. A picture image processing system according to claim 1, further including enciphered identification key mode data associated with the picture image data, and wherein said controlling means initiates an enciphered identification key input sequence by said enciphered identification key input means to enable entry of an enciphered identification key responsive to said enciphered identification key code.

5. A picture image processing system according to claim 1, further including an optical scanner for scanning batches of original documents to generate the picture input data, and wherein said system further includes a job control sheet associated with each of the batches of documents for setting at least some of the job parameters, the enciphered identification key code, and enciphered identification key mode data for said batches.

6. A picture image processing system according to claim 1, further including:
   enciphered identification key mode data associated with the picture image data;
   picture image datafile displaying means for displaying a list of picture image datafiles stored on the storing means and the corresponding enciphered identification key mode data and enciphered identification key code for the picture image datafiles stored in the storing means; and
   wherein said control means controls the picture image output unit to output picture image datafiles stored in the storing means when the enciphered identification key codes for the picture image datafiles identified in said list displayed by said displaying means corresponds to an enciphered identification key input by the enciphered identification key input means.

7. A picture image processing system according to claim 1, further including picture image datafile deleting means for deleting picture image datafiles and corresponding job parameters and enciphered identification key codes from said storing means responsive to the output of the picture image datafiles by the picture image output unit.

8. A picture image processing system according to claim 1, further including picture image datafile deleting means for deleting picture image datafiles and corresponding job parameters and enciphered identification key codes from said storing means even when said cipher deciding means determines that the enciphered identification key inputted by said input unit does not correspond to the enciphered identification key codes associated with one of the picture image datafiles.

* * * * *

UNITED STATES PATENT AND TRADEMARK OFFICE
CERTIFICATE OF CORRECTION

PATENT NO.   :   5,168,371
DATED        :   December 01, 1992
INVENTOR(S)  :   Hiroshi Takayanagi It is certified that error appears in the above-identified patent and that said Letters Patent is hereby corrected as shown below: Title page, item (54):

In the title, line 3, change "TRANSMITTING" to --OUTPUTTING--.

Signed and Sealed this

Twenty-first Day of December, 1993

Attest:

BRUCE LEHMAN

*Attesting Officer*   *Commissioner of Patents and Trademarks*